United States Patent
Tanase

(10) Patent No.: US 9,163,981 B2
(45) Date of Patent: *Oct. 20, 2015

(54) AMBIENT LIGHT BASED GESTURE DETECTION

(71) Applicant: Maxim Integrated Products, Inc., San Jose, CA (US)

(72) Inventor: Gabriel E. Tanase, Cupertino, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/316,928

(22) Filed: Jun. 27, 2014

(65) Prior Publication Data

US 2014/0319326 A1 Oct. 30, 2014

Related U.S. Application Data

(63) Continuation of application No. 13/349,532, filed on Jan. 12, 2012, now Pat. No. 8,766,162.

(51) Int. Cl.
| H03F 3/08 | (2006.01) |
| G01J 1/42 | (2006.01) |
| G06F 3/042 | (2006.01) |
| G01S 17/50 | (2006.01) |
| G06F 3/01 | (2006.01) |
| G06F 3/0488 | (2013.01) |

(52) U.S. Cl.
CPC . *G01J 1/42* (2013.01); *G01S 17/50* (2013.01); *G06F 3/017* (2013.01); *G06F 3/042* (2013.01); *G06F 3/04883* (2013.01)

(58) Field of Classification Search
USPC ........ 250/214 AL, 214 B, 221; 340/540, 541, 340/545.2, 545.3
See application file for complete search history.

(56) References Cited

U.S. PATENT DOCUMENTS 8,766,162 B2 * 7/2014 Tanase .................... 250/214 AL
2012/0268274 A1 10/2012 Wieser

FOREIGN PATENT DOCUMENTS

WO 2011085420 7/2011

* cited by examiner

*Primary Examiner* — Renee D Chavez
(74) *Attorney, Agent, or Firm* — Advent, LLP

(57) ABSTRACT

A gesture sensing device includes one or more sensors and a processor for processing sensed voltages output from the sensors based on ambient light and/or reflected light received by the sensors. The processor determines an ambient light level and/or a distance between the target and the sensors such that, if the ambient light level exceeds an ambient light threshold and/or the distance is less than a distance threshold, the processor determines the motion of a target relative to the sensors based on the ambient light instead of the reflected light.

16 Claims, 3 Drawing Sheets

AMBIENT LIGHT BASED GESTURE DETECTION

FIELD OF THE INVENTION

This invention relates to gesture detection. More specifically, this invention relates to a device that senses and determines physical gestures.

BACKGROUND OF THE INVENTION

A gesture sensor is a human interface device that enables the detection of physical movement without the user actually touching the device within which the gesture sensor resides. The detected movements can be subsequently used as input commands to the device. In some applications, the device is programed to recognize distinct non-contact hand motions, such as left to right, right to left, up to down, down to up, diagonally up to left, diagonally up to right, in to out, and out to in hand motions. Gesture sensors have found popular use in handheld devices, such as tablet computing devices and smartphones, and other portable devices, such as laptops. Gesture sensors are also being implemented in video game consoles that detect the motion of a video game player.

FIG. 1 illustrates a conventional gesture sensing system 100. As shown in FIG. 1, the system 100 includes an illumination source 102 for outputting light 106 and a light sensor 104 for receiving light. In operation, the illumination source 102 is turned on and off, or flashed, in succession in order for the sensor 104 to obtain spatial information about an object 99 proximate the light sensor 104. Specifically, the light sensor 104 is able to receive a portion of the light 106 from the illumination source 102 that has reflected off of the object 99 and back to the light sensor 104. Based on this received reflected light 108, the movement or gesture of the object 99 is able to be determined. FIG. 2 illustrates a signal diagram 200 corresponding to the gesture sensor system 100 shown in FIG. 1. Specifically, as shown in FIG. 2, as the illumination source signal 202 turns on from time t0 to t1 and time t2 to t3 (e.g. the illumination source 102 flashes) the reflected light 108 received by the light sensor 104 causes the light sensor signal 204 to increase above the measured ambient light level 210 wherein the increase corresponds to the spatial characteristics of the object 99. As a result, movement or gestures of the object 99 are able to be determined based on the measured increases over time.

However, a disadvantage of these conventional systems 100 is the amount of noise on the sensor 104 of the system caused by the ambient light 110. In particular, as the ambient light level 210 increases the minimum detectable signal increases thereby reducing the resolution and effectiveness of the system 100. As a result, many of these systems are forced to employ costly noise cancellation elements in order to cancel out the noise caused by the ambient light. With ever decreasing device size, additional components are undesirable.

SUMMARY OF THE INVENTION

Embodiments are disclosed of a gesture sensing device comprise one or more sensors and a processor for processing sensed voltages output from the sensors based on ambient light and/or reflected light received by the sensors. The processor determines an ambient light level and/or a distance between the target and the sensors such that, if the ambient light level exceeds an ambient light threshold and/or the distance is less than a distance threshold, the processor determines the motion of a target relative to the sensors based on the ambient light instead of the reflected light.

A first aspect of the present application is directed to a device for detecting a gesture by a target. The device comprises one or more light sensors that each output a sensor signal corresponding to ambient light sensed by the sensors and a processor coupled with the light sensors, wherein the processor determines a motion of the target based on the ambient light received by the sensors as the target moves proximate the light sensors. In some embodiments, the processor is not coupled with a source of the ambient light. In some embodiments, the device further comprises a detector coupled with the processor, wherein the detector determines an ambient light value based on the ambient light. In some embodiments, the processor only determines the motion of the target based on the ambient light if the ambient light value exceeds an ambient light threshold value. In some embodiments, the detector is one or more of the light sensors, and the detector outputs one of the sensor signals. In some embodiments, the processor only determines the motion of the target based on the ambient light if a distance value corresponding to the distance from the sensors to the target is within a target distance threshold value. In some embodiments, the processor determines if the target is present based on the ambient light if the distance value is not within the target distance threshold value. In some embodiments, the device further comprises a light source coupled with the processor that outputs source light, wherein the distance value is determined by the processor based on source light reflected off the target and received by the sensors. In some embodiments, the processor causes the light source to only output light for a period sufficient to determine the distance value. In some embodiments, if the ambient light value does not exceed the ambient light threshold value, the processor determines the motion of the target based on the source light reflected off the target and received by the sensors. The processor determines the motion of the target periodically, continuously or selectively. In some embodiments, the processor determines the motion of the target based on the ambient light by monitoring sudden decreases in the sensor signal. In some embodiments, the processor determines the motion of the target based on the source light reflected off the target by monitoring sudden increases in the sensor signal.

A second aspect of the present application is directed to a method of detecting a gesture by a target. The method comprises receiving ambient light with one or more light sensors and outputting a sensor signal corresponding to ambient light sensed by the sensors and determining a motion of the target based on the ambient light received by the sensors as the target moves proximate the light sensors. In some embodiments, the processor is not coupled with a source of the ambient light. In some embodiments, the method further comprises determining an ambient light value based on the ambient light with a detector. In some embodiments, the processor only determines the motion of the target based on the ambient light if the ambient light value exceeds an ambient light threshold value. In some embodiments, the detector is one or more of the light sensors, and the detector outputs one of the sensor signals. In some embodiments, the processor determines the motion of the target based on the ambient light only if a distance value corresponding to the distance from the sensors to the target is within a target distance threshold value. In some embodiments, the method further comprises determining if the target is present based on the ambient light if the distance value is not within the target distance threshold value. In some embodiments, the method further comprises outputting source light with a light source, wherein the distance value is determined by the processor based on source light reflected off the target and received by the sensors. In some embodiments, the processor causes the light source to only output light for a period sufficient to determine the distance value. In some embodiments, the method further comprises determining the motion of the target based on the source light reflected off the target and received by the sensors if the ambient light value does not exceed the ambient light threshold value. The processor determines the motion of the target periodically, continuously or selectively. In some embodiments, the processor determines the motion of the target based on the ambient light by monitoring sudden decreases in the sensor signal. In some embodiments, the processor determines the motion of the target based on the source light reflected off the target by monitoring sudden increases in the sensor signal.

Another aspect of the present application is directed to a device for detecting a gesture by a target. The device comprises a first light source for producing a first light, one or more sensors for sensing the first light and a second light and a processor coupled with the one or more sensors, wherein the processor determines the motion of the target based on the second light received by the sensors if ambient light received by the sensors is greater than an ambient light threshold value and otherwise determines the motion of the target based on the first light received by the sensors. In some embodiments, the processor is not coupled with the source of the second light. In some embodiments, the processor determines the motion of the target based on the second light only if the ambient light received by the sensors is greater than the ambient light threshold value and the target is within a threshold distance from the sensors. In some embodiments, the processor determines if the target is present if the ambient light received by the sensors is greater than the ambient light threshold value, but the target is not within the threshold distance from the sensors. In some embodiments, the first light reflects off of the target before being sensed by the sensors and the second light does not reflect off the target before being sensed by the sensors. In some embodiments, the second light is a portion of the ambient light. In some embodiments, the device further comprises a detector coupled with the processor, wherein the detector determines the ambient light value based on the ambient light. In some embodiments, the detector is one or more of the light sensors. In some embodiments, the distance between the sensors and the target is determined by the processor based on the first light reflected off the target and received by the sensors. In some embodiments, the processor causes the first light source to only output the first light for a period sufficient to determine the distance between the target and the sensors. The processor determines the motion of the target periodically, continuously or selectively. In some embodiments, the processor determines the motion of the target based on the second light by monitoring sudden decreases in a sensor signal, wherein the sensor signal is output by the sensors based on the received first light and second light. In some embodiments, the processor determines the motion of the target based on the first light reflected off the target by monitoring sudden increases in the sensor signal.

Yet another aspect of the present application is directed to a method of detecting a gesture by a target. The method comprises sensing a first light produced by a first light source and a second light with one or more sensors and determining the motion of the target with a processor based on the second light received by the sensors if ambient light received by the sensors is greater than an ambient light threshold value and otherwise determining the motion of the target based on the first light received by the sensors. In some embodiments, the processor is not coupled with the source of the second light. In some embodiments, the method further comprises determining the motion of the target with the processor based on the second light if the ambient light received by the sensors is greater than the ambient light threshold value and the target is within a threshold distance from the sensors. In some embodiments, the method further comprises determining if the target is present with the processor if the ambient light received by the sensors is greater than the ambient light threshold value, but the target is not within the threshold distance from the sensors. In some embodiments, the first light reflects off of the target before being sensed by the sensors and the second light does not reflect off the target before being sensed by the sensors. In some embodiments, the second light is a portion of the ambient light. In some embodiments, the method further comprises determining the ambient light value with a detector based on the ambient light. In some embodiments, the detector is one or more of the light sensors. In some embodiments, the method further comprises determining the distance between the sensors and the target with the processor based on the first light reflected off the target and received by the sensors. In some embodiments, the method further comprises only outputting the first light with the first light source for a period sufficient to determine the distance between the target and the sensors. The processor determines the motion of the target periodically, continuously or selectively. In some embodiments, the processor determines the motion of the target based on the second light by monitoring sudden decreases in a sensor signal, wherein the sensor signal is output by the sensors based on the received first light and second light. In some embodiments, the processor determines the motion of the target based on the first light reflected off the target by monitoring sudden increases in the sensor signal.

DETAILED DESCRIPTION OF THE EMBODIMENTS

Figure 1:
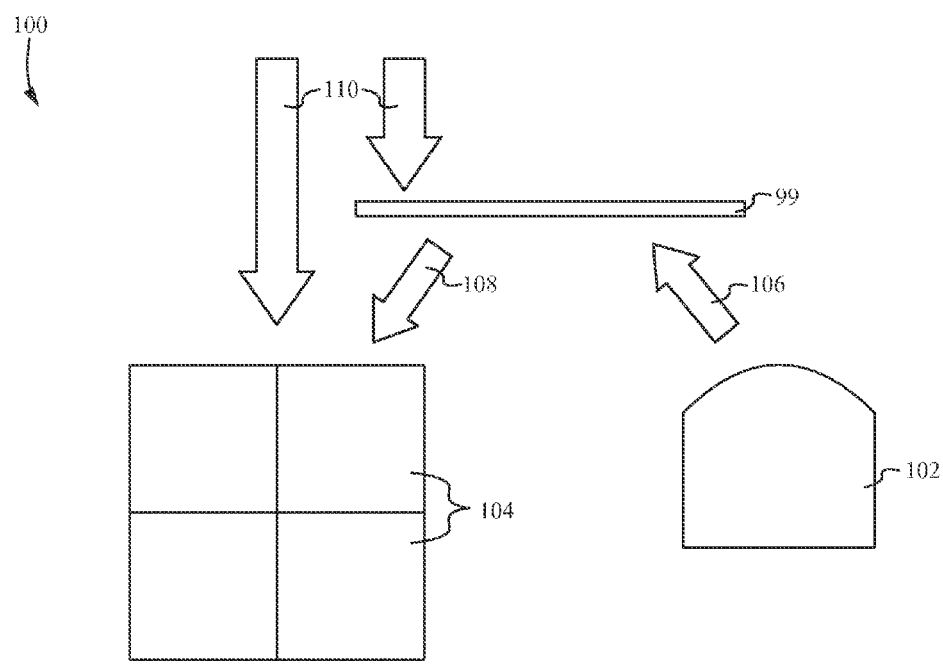
FIG. 1 illustrates a conventional gesture sensing system.
Figure 2:
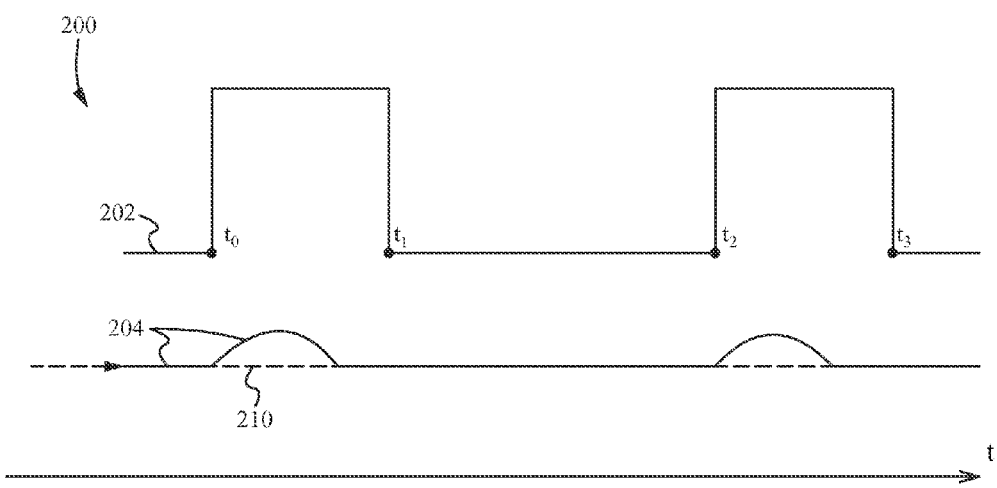
FIG. 2 illustrates a signal diagram corresponding to the conventional gesture sensor system shown in FIG. 1.

Embodiments of the present application are directed to a gesture sensing device for detecting gestures. Those of ordinary skill in the art will realize that the following detailed description of the device is illustrative only and is not intended to be in any way limiting. Other embodiments of the device will readily suggest themselves to such skilled persons having the benefit of this disclosure.

Reference will now be made in detail to implementations of the device as illustrated in the accompanying drawings. The same reference indicators will be used throughout the drawings and the following detailed description to refer to the same or like parts. In the interest of clarity, not all of the routine features of the implementations described herein are shown and described. For example, the device described below is able to comprise one or more additional component such as memory as are well known in the art, but have been omitted here for the sake of brevity. It will, of course, be appreciated that in the development of any such actual implementation, numerous implementation-specific decisions will likely be made in order to achieve the developer's specific goals, such as compliance with application and business related constraints, and that these specific goals can vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of a gesture sensing device and method are described herein. The gesture sensing device comprises one or more sensors and a processor for processing sensed voltages output from the sensors based on ambient light and/or reflected light received by the sensors. In operation, the processor determines an ambient light level and/or a distance between the target and the sensors such that, if the ambient light level exceeds an ambient light threshold and/or the distance is less than a distance threshold, the processor determines the motion of a target relative to the sensors based on the ambient light instead of the reflected light. Thus, the gesture sensing device and method provides the advantage of making the ambient light the signal instead of noise in areas with high ambient light levels. As a result, the device and method provide accurate and lower cost operation in areas of high ambient light levels because it does not need costly ambient light and/or other noise cancellation features. Further, the gesture sensing device and method provide the advantage of increased power saving due to its ability to use existing ambient light instead of powering a light source. Finally, the gesture sensing device and method provides the advantage of enabling switching between two or more gesture sensing modes and a presence sensing based on the levels of ambient light and/or distance of the target thereby tailoring the sensing mode to the environment. As used herein, a gesture of the target is able to comprise velocity, acceleration, rotation and/or other spatial characteristics of the target, and ambient light is able to comprise light whose source is not controlled or powered by the device and/or light controlled or powered by the device but not reflected off the target.

Figure 3:
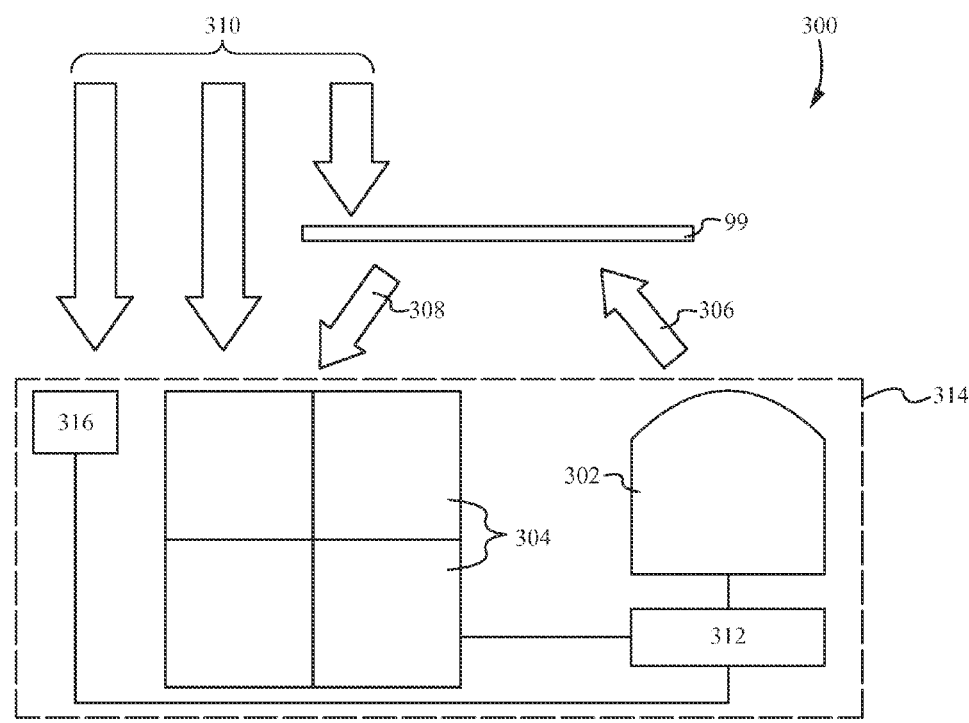
FIG. 3 illustrates a conceptual diagram of a gesture sensing system according to some embodiments.

FIG. 3 illustrates a conceptual diagram of a gesture sensing system 300 according to some embodiments. As shown in FIG. 3, the gesture sensing system 300 comprises a target 99 and a gesture sensing device 314. In some embodiments, the target 99 is a finger or hand. Alternatively, the target 99 is able to be any tangible object as are well known in the art. In some embodiments, the gesture sensing device 314 is a mobile computing device including but not limited to a mobile phone, tablet computer, PDA, gaming device, gaming controller, laptop computer, or desktop computer. Alternatively, the gesture sensing device 314 is able to be one or more other electronic devices as are well known in the art. The gesture sensing device 314 comprises one or more light sources 302 for outputting light 306, one or more light sensors 304 for receiving light, an ambient light detector 316 and at least one processor 312 coupled with the ambient light detector 316, the light sources 302 and light sensors 304. Alternatively, one or more of the above components are able to be separate from the device 314. In some embodiments, the processor 312 is electrically coupled with the ambient light detector 316, the light sources 302 and/or the light sensors 304. Alternatively, the processor 312 is able to be wirelessly or otherwise coupled with the ambient light detector 316, the light sources 302 and/or light sensors 304 such that the processor 312 is able to receive output signals from the ambient light detector 316 and the light sensors 304, and transmit control signals to the light sources 302. In some embodiments, the light sources 302 comprise light emitting diodes (LEDs). Alternatively, one or more of the light sources 302 are able to comprise other types of light emitting devices or elements as are well known in the art. In some embodiments, the light sensors 304 comprise photo detectors. Alternatively, one or more of the light sensors 304 are able to comprise other types of light detecting devices or elements as are well known in the art. In some embodiments, the ambient light detector 316 is one or more of the light sensors 304. Alternatively, the ambient light detector 316 is distinct from the light sensors 304.

In operation, the ambient light detector 316 detects ambient light 310 within the system 300 and outputs an ambient light signal or value based on the received ambient light 310 to the processor 312. The processor 312 compares the received ambient light signal or value to a preselected ambient light threshold value stored in processor memory or other memory (not shown) on the device 314. If the ambient light value/signal is not greater than the ambient light threshold value, the processor 312 switches to or continues determining the gestures of the target 99 based on the source light 306, 308. Specifically, if the value/signal is not greater, the gesture information is obtained by flashing or turning the light source 302 on and off in succession with the processor 312. In particular, the light sensors 304 are able to receive a reflected portion 308 of the source light 306 from the flashed light source 302 that has reflected off of the target 99 and back to the light sensors 304. Based on this received reflected light 308, the gesture of the target 99 is able to be determined by monitoring sudden increases or "bumps" in the sensed light 308 over time. These "bumps" correspond to changes in the amount of light 308 reflected off of the target 99 because of movement or gestures of the target 99. As a result, the "bumps" enable the processor 312 to determine the gestures of the target 99. In this "source light mode," the source light 306, 308 is considered the signal and the ambient light 310 is considered noise such that as ambient light levels increase the signal to noise ratio becomes worse.

However, if the ambient light value/signal is greater than the ambient light threshold value, the processor 312 switches to or continues determining either the gestures or presence of the target 99 based on the ambient light 310. Specifically, if the ambient light value/signal is greater, the gesture or presence of the target 99 is determined by turning off the light source 302 with the processor 312 such that only the ambient light 310 (not reflected source light 308) is received by the sensors 304. In particular, the light sensors 304 are able to receive a portion of the ambient light 310 that has not been blocked or occluded by the target 99. Based on this received ambient light 310, the presence or gesture of the target 99 is able to be determined by monitoring sudden decreases or "dips" 414 (see FIG. 4) in the sensed ambient light 310 over time. These "dips" 414 correspond to changes in the amount of light occluded by the target 99 because of the presence or gestures of the target 99. As a result, these "dips" 414 enable the processor 312 to determine the presence or gestures of the target 99. In this "ambient light mode," the ambient light 310 itself is considered the signal such that as the ambient light levels increase the signal to noise ratio improves. Thus, the device 314 is able to provide the advantage of efficient operation low ambient light areas as well as in high ambient light areas with improved signal to noise ratios and no need for ambient light noise cancellation components.

In order to distinguish between presence determination and gesture determination, during "ambient light mode," the device 314 performs a target proximity test. Specifically, if the target 99 is discovered to be proximate the sensors 304, the ambient light 310 is able to be used to determine the gestures of the target 99. Alternatively, if the target 99 is discovered to be remote from the sensors 304, the ambient light 310 is able to be used to determine the presence of the target 99. In some embodiments, the target proximity test is performed after the comparison of the ambient light threshold value, but before monitoring the signal or signals output by the sensors 304 for decreases or "dips" 414. Alternatively, the target proximity test is able to be performed at any time during operation. During the proximity test, the processor 312 turns on the light source 302 for a proximity period 406 (see FIG. 4) in order to determine if the target 99 is proximate the sensors 304. This process is similar to the gesture detection using the reflected light 306 in "source light mode" described above, except that the proximity period 406 is only long enough for the processor 312 to determine that the reflected light 308 received by the sensors 304 indicates the proximity or lack of proximity of the target 99. Alternatively, the proximity period 406 is able to be greater than the time required to determine proximity of the target 99 using the reflected light 308.

In some embodiments, this proximity determination/test is performed by the processor 312 comparing the increase or "bump" 408 (see FIG. 4) in the sensor signal or signals during the proximity period 406 to a proximity threshold value. Alternatively, the proximity determination is performed by comparing the maximum or average value of the sensor signal or signals during the proximity period 406 to the proximity threshold value. In either case, if the change or value of the sensor signal is greater than the proximity threshold value, the target 99 is determined to be proximate the sensors 304, and if not the target 99 is determined to be remote from the sensors 304. In some embodiments, the proximity threshold value is dynamic and determined based on the received ambient light 310 such that the proximity threshold is adjusted to always be a predefined delta value greater than the current ambient light 310 value. In such embodiments, the delta value is able to be selected based on the effects of the distance of the target 99 from the sensors 304 on the sensor signal or signals such that the delta value corresponds to a desired distance between the target 99 and the sensors 304. Alternatively, the proximity threshold value is able to be a predefined static value. Thus, the gesture sensing device 314 is able to switch between ambient light presence sensing and ambient light gesture sensing based on the proximity of the target 99. This enables the gesture sensing device 314 to ensure the accuracy of the gesture sensing by minimizing the possibility of shadowing effects causing a false gesture detection when the target 99 is remote from the sensors 304. In some embodiments, other forms of target 99 proximity detection are able to be used in place of or in cooperation with the light source 302 as are well known in the art. Alternatively, use of the light source 302 for proximity detection and/or other proximity detection is able to be omitted such that the device 314 selectively operates in presence detection mode or gesture detection mode.

It is understood that each of the operations discussed above are able to be performed by the device 314 continuously, periodically, and/or upon demand. For example, the processor 312 is able to continuously, periodically and/or upon request from a user check the ambient light levels received by the ambient light detector 316 to determine if the device 314 should switch between using the ambient light 130 or the source light 306, 308 to determine target 99 gestures. Additionally, it is understood, that although the operation of the gesture sensing device 314 is described beginning with the detection of the ambient light 310, the operation is able to begin at other points as described above.

Figure 4:
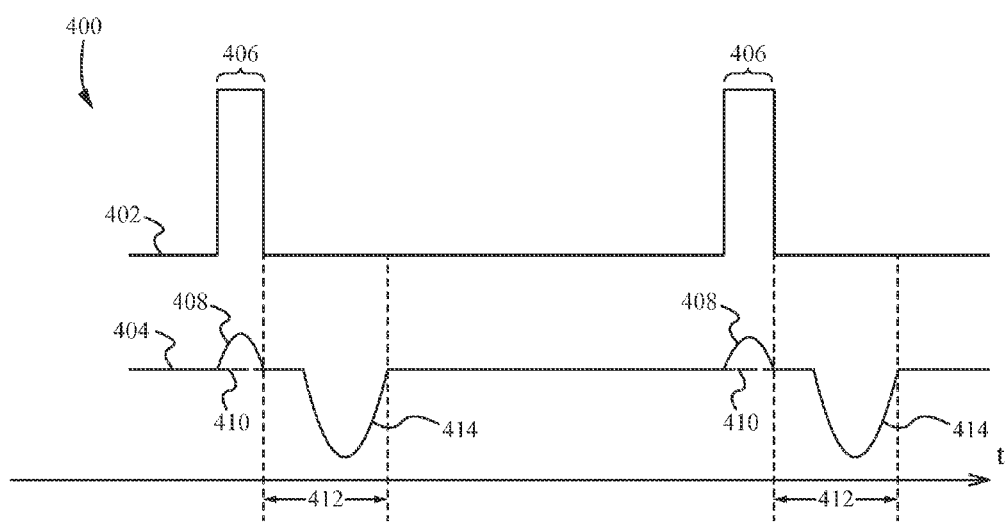
FIG. 4 illustrates a signal diagram corresponding to the ambient light mode of the gesture sensing system shown in FIG. 3 according to some embodiments.

FIG. 4 illustrates a signal diagram 400 corresponding to the ambient light mode of the gesture sensing system 300 shown in FIG. 3 according to some embodiments. Specifically, as shown in FIG. 4, during the proximity period 406, the light source signal 402 goes from "low" to "high" as the light source 302 is turned on or flashed by the processor 312. As a result, if the target 99 is proximate the sensors 304 as shown in FIG. 3, the sensor signal 304 will exhibit a sudden increase or "bump" 408 over the ambient light level 410 due to the reflected light 308 received from the light source 302 as described above. Accordingly, once the proximity period 406 has ended and the light source 302 has been turned off, the processor 312 is able to monitor the sensor signal 404 for sudden decreases or "dips" 414 during a gesture or presence sensing period 412 and use that data to calculate the presence or gestures of the target 99. In particular, the device 314 is able to determine the presence of the target 99 if the target 99 was determined to not be proximate the sensors 304 and is able to determine the gestures of the target 99 if the target 99 was proximate. In some embodiments, the presence or gesture sensing period 412 lasts from the end of one proximity period 406 to the beginning of the next proximity period 406. Alternatively, the presence or gesture sensing period 412 is able to be less or more than the time between proximity periods 406. These ambient light mode proximity detection processes and monitoring processes are able to be repeated over time in order to monitor the "dips" 414 caused by targets and enable the processor 312 to determine the presence and/or gestures of the target 99.

Figure 5:
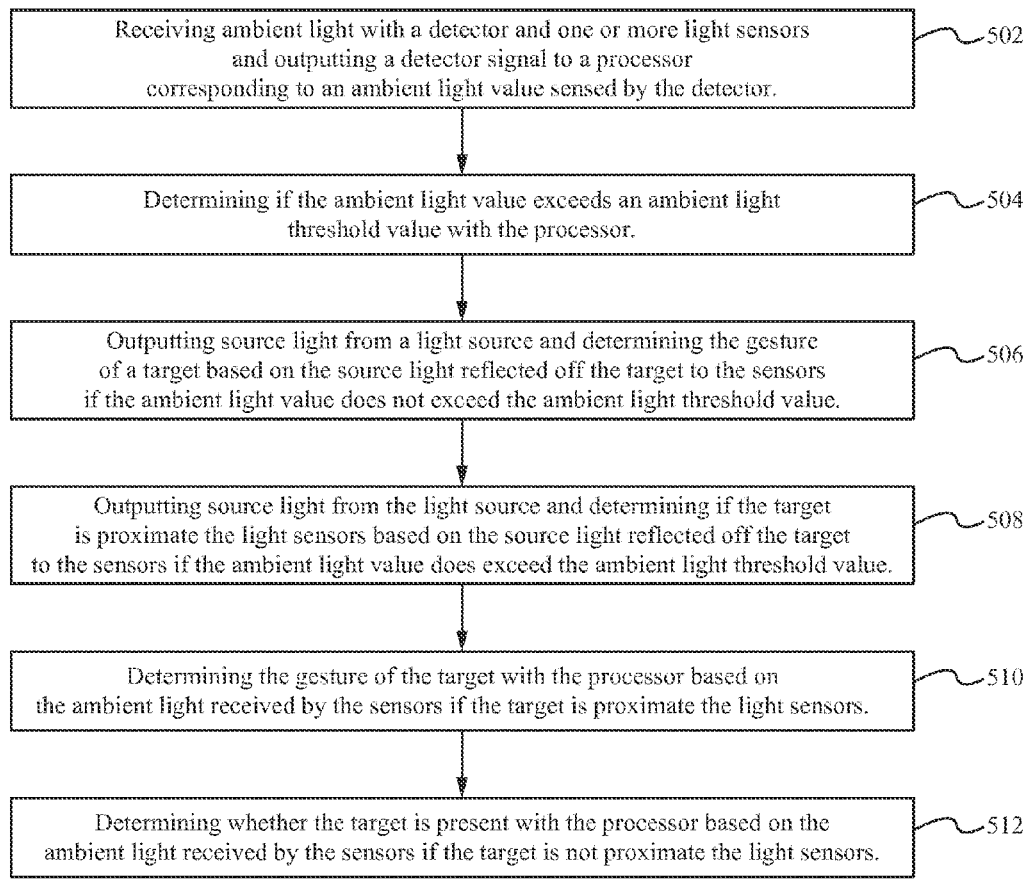
FIG. 5 illustrates a flow chart of a method of using a gesture sensing system according to some embodiments.

FIG. 5 illustrates a flow chart of a method of using a gesture sensing system 300 of FIG. 3 according to some embodiments. At the step 502, the ambient light detector 316 and light sensors 304 receive ambient light 310 and output a detector signal to the processor 312 corresponding to an ambient light value sensed by the detector 316. In some embodiments, the detector 316 is one or more of the light sensors 304. At the step 504, the processor 312 determines if the ambient light value exceeds an ambient light threshold value. At the step 506, if the ambient light value does not exceed the ambient light threshold value, the light source 302 outputs source light 306 and the processor 312 determines the gesture of the target 99 based on the source light 308 reflected off the target 99 to the sensors 304. In some embodiments, the processor 312 determines the gestures of the target 99 based on the source light 308 reflected off the target 99 by monitoring sudden increases in the sensor signal 404. At the step 508, if the ambient light value does exceed the ambient light threshold value, the light source 302 outputs source light 306 and the processor 312 determines if the target 99 is proximate the light sensors 304 based on the source light 308 reflected off the target 99 to the sensors 304. In some embodiments, the processor 312 determines whether the target 99 is proximate the sensors 304 by comparing a distance value corresponding to the distance between the sensors 304 and the target 99 with a target distance threshold value, wherein if the distance value is within the threshold value the target 99 is determined to be proximate. In some embodiments, the processor 312 determines the distance value by outputting source light 306 with the light source 302, wherein the distance value is based on the source light 308 reflected off the target 99 to the sensors 304. In some embodiments, the processor 312 causes the light source 302 to only output source light 306 for a proximity period 406 sufficient to determine the distance value. Alternatively, the step 508 is able to be omitted. At the step 510, if the target 99 is proximate the light sensors 304, the processor 312 determines the gesture of the target 99 based on the ambient light 310 received by the sensors 304. In some embodiments, the processor 312 determines the gesture of the target 99 based on the ambient light 310 by monitoring sudden decreases 414 in the sensor signal 404. At the step 512, if the target 99 is not proximate the light sensors 304, the processor 312 determines whether the target 99 is present based on the ambient light 310 received by the sensors 304. In some embodiments, the processor 312 determines the gestures and/or presence of the target 99 periodically, continuously or selectively.

The device and method of ambient light based gesture detection described herein has numerous advantages. Specifically, the device and method is able to operate efficiently at both high and low ambient light levels without the increased cost of ambient light cancellation components or signal amplifying components such as lenses. Indeed, unlike other methods and devices, the signal to noise ratio of the device and method is actually improved with increased ambient light levels. Further, the device and method are able to use less power by minimizing the need to power a light source for providing reflected light to detect the gestures. Moreover, the device and method provides the advantage of using proximity detection to switch between presence detection and gesture detection thereby minimizing the possibility of false gesture readings due to shadowing effect. Accordingly, it is clear that the ambient light based gesture device and method described herein has many benefits.

The present application has been described in terms of specific embodiments incorporating details to facilitate the understanding of the principles of construction and operation of the gesture sensing device and method for detecting gestures. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A device for detecting a gesture by a target comprising:
   a plurality of light sensors that each output a sensor signal corresponding to ambient light sensed by the sensors;
   a processor coupled with the plurality of light sensors, wherein the processor determines a motion of the target based on the ambient light received by the plurality of sensors as the target moves proximate the plurality of light sensors;
   a light source coupled with the processor that outputs source light; and
   a detector coupled with the processor, wherein the detector determines an ambient light value based on the ambient light,
   wherein the processor determines the motion of the target based on the ambient light only when the ambient light value exceeds an ambient light threshold value, and wherein the processor determines the motion of the target based on the ambient light only when a distance value corresponding to the distance from the sensors to the target is within a target distance threshold value.

2. The device of claim 1 wherein the processor determines when the target is present based on the ambient light when the distance value is not within the target distance threshold value.

3. The device of claim 1 wherein the distance value is determined by the processor based on source light reflected off the target and received by the plurality of sensors.

4. The device of claim 3 wherein the processor causes the light source to only output light for a period sufficient to determine the distance value.

5. The device of claim 3 wherein when the ambient light value does not exceed the ambient light threshold value, the processor determines the motion of the target based on the source light reflected off the target and received by the plurality of sensors.

6. The device of claim 5 wherein the processor determines the motion of the target periodically, continuously, or selectively.

7. The device of claim 6 wherein the processor determines the motion of the target based on the ambient light by monitoring sudden decreases in the sensor signal.

8. The device of claim 7 wherein the processor determines the motion of the target based on the source light reflected off the target by monitoring sudden increases in the sensor signal.

9. A device for detecting a gesture by a target comprising:
   a first light source for producing a first light;
   a second light source for producing a second light;
   an array of sensors for sensing the first light and a second light; and
   a processor coupled with the one or more sensors, wherein the processor determines the motion of the target based on the second light received by the sensors when ambient light received by the sensors is greater than an ambient light threshold value and otherwise determines the motion of the target based on the first light received by the sensors, wherein the processor is not coupled with the second light source, wherein the processor determines the motion of the target based on the second light only when the ambient light received by the array sensors is greater than the ambient light threshold value and the target is within a threshold distance from the array of sensors.

10. The device of claim 9 wherein the processor determines when the target is present if the ambient light received by the sensors is greater than the ambient light threshold value, but the target is not within the threshold distance from the array of sensors.

11. The device of claim 10 wherein the first light reflects off of the target before being sensed by the array of sensors and the second light does not reflect off the target before being sensed by the array of sensors.

12. The device of claim 11 further comprising a detector coupled with the processor, wherein the detector determines the ambient light value based on the ambient light.

13. The device of claim 12 wherein the distance between the array of sensors and the target is determined by the processor based on the first light reflected off the target and received by the array of sensors.

14. The device of claim 13 wherein the processor causes the first light source to only output the first light for a period sufficient to determine the distance between the target and the array of sensors.

15. The device of claim 14 wherein the processor determines the motion of the target periodically, continuously, or selectively.

16. The device of claim 15 wherein the processor determines the motion of the target based on the second light by monitoring sudden decreases in a sensor signal, wherein the sensor signal is output by the array of sensors based on the received first light and second light.

* * * * *